(12) United States Patent
Outlaw et al.

(10) Patent No.: US 7,839,268 B2
(45) Date of Patent: Nov. 23, 2010

(54) METHOD, SYSTEM AND PROGRAM PRODUCT FOR TONAL AUDIO-BASED MONITORING OF NETWORK ALARMS

(75) Inventors: Michael P. Outlaw, Dallas, GA (US); William P. Shaouy, Atlanta, GA (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 455 days.

(21) Appl. No.: 11/843,213

(22) Filed: Aug. 22, 2007

(65) Prior Publication Data

US 2009/0051507 A1  Feb. 26, 2009

(51) Int. Cl.
*G08B 3/00* (2006.01)
(52) U.S. Cl. .................................................. 340/384.1
(58) Field of Classification Search ............... 340/384.1, 340/506, 523, 526, 692, 3.1
See application file for complete search history.

(56) References Cited

U.S. PATENT DOCUMENTS

| | | | |
|---|---|---|---|
| 7,137,074 B1 * | 11/2006 | Newton et al. ............... | 715/835 |
| 2003/0135382 A1 * | 7/2003 | Marejka et al. ................. | 705/1 |
| 2003/0193967 A1 | 10/2003 | Fenton et al. | |
| 2004/0015582 A1 | 1/2004 | Pruthi | |
| 2004/0184401 A1 | 9/2004 | Nguyen et al. | |
| 2004/0220774 A1 * | 11/2004 | Agarwal et al. ............. | 702/183 |
| 2005/0108387 A1 | 5/2005 | Li et al. | |
| 2006/0130070 A1 | 6/2006 | Graf | |

FOREIGN PATENT DOCUMENTS

| | | |
|---|---|---|
| EP | 1548683 A | 6/2009 |
| WO | WO0273445 A | 2/2002 |

OTHER PUBLICATIONS

Francioni, J. M. et al, "The Sounds of Parallel Programs", Computer Science Department, University of Southwestern Louisiana, IEEE, Apr. 28, 1991.
International Search Report, International Application No. PCT/EP2008/060806, Dated Apr. 29, 2009.

* cited by examiner

*Primary Examiner*—Phung Nguyen
(74) *Attorney, Agent, or Firm*—John R. Pivnichny; Law Office of Jim Boice

(57) ABSTRACT

A method, system and program product for audio tonal monitoring of an alarm generated by a device in a network. The method includes mapping a severity level for an alert to be generated for a device in a network to at least one audio tone having a plurality of audible characteristics, generating an alert for the device when an error associated with the device is learned and sending to a monitoring system the alert generated, the alert containing data or information. The method further includes decrypting the alert received and formatting the alert received to add additional information and forwarding the formatted alert to an alert-to-audio cue manager. Further, the method includes mapping the alert forwarded to the audio tone having the plurality of audible characteristics, and playing the audio tone, such that the audio tone played audibly alerts a client of the alert generated by the device.

23 Claims, 4 Drawing Sheets

METHOD, SYSTEM AND PROGRAM PRODUCT FOR TONAL AUDIO-BASED MONITORING OF NETWORK ALARMS

FIELD OF THE INVENTION

The present invention relates to the field of monitoring systems and, more particularly, the invention relates to a method, system and computer program product for tonal based monitoring of network alarms or alerts, such as, an error associated with a piece of hardware or software on a network, so that the nature of the alarm is conveyed by the nature of the audio tones generated.

BACKGROUND OF THE INVENTION

In today's business environment, customers are increasingly conducting online or electronic transactions over the Internet with organizations and/or businesses, such as retailers, banking services, etc. Invariably, with increasing traffic over the Internet, managing or maintaining a computer infrastructure or system used in a business operation is crucial. Accordingly, businesses and/or organizations want to ensure that all aspects of a computer infrastructure employed are operational and that any critical situations that may occur are not missed. As such, there is a need for a business and/or organization to effectively monitor a computer infrastructure for any situation that may need attention without affecting costs and/or customer satisfaction.

SUMMARY OF THE INVENTION

In a first aspect of the invention, there is provided a method for audibly monitoring an alert or alarm in a network. The method includes mapping, using a mapping system, a severity level for a respective alert for a respective device in the network to one or more respective audio tones having a respective plurality of audible characteristics. The method includes generating an alert for a device in a network when an error associated with the device is learned and sending to a monitoring system the alert generated for the device in the network, the alert containing data or information. The method further includes decrypting the respective alert received and formatting the alert received to add additional information and forwarding the alert formatted to an alert-to-audio cue manager. In an embodiment, the formatting step includes defining, using XML, a group in the network that the respective device is associated with. Further, the method includes mapping the alert forwarded to one or more audio tones, each audio tone having a plurality of audible characteristics, and playing the audio tones, such that the audio tones played audibly alerts a client of the alert generated. In an embodiment, the mapping step includes querying whether the respective alert received for the device having a respective severity level is mapped to one or more respective audio tones having the respective plurality of audible characteristics and if the alert received for the respective device is mapped, verifying a configuration of a sound generator to be used for producing the respective audio tones. The method further includes filtering an alert based on the defining of the group in the network that the device is associated with and based on the formatting of the alert to add additional information. In an embodiment, the playing step further includes communicating the respective audio tones having the respective plurality of audible data characteristics corresponding to the respective alert to the client via the sound generator. In an embodiment, the plurality of audible data characteristics includes at least one of duration, pitch, velocity and channel and wherein the sound generator includes at least one of a directly connected sound generator and a remotely connected sound generator.

In another aspect of the invention, there is provided a system for audio tonal monitoring of network alarms. The system includes an alarm-to-mapping system configured to map for a device in a network an alarm of a plurality of alarms, the alarm for the device corresponding to an error and being mapped to one or more audio tones, each of the one or more audio tones having a plurality of audible data parameters. The system further includes a monitoring system configured to monitor the plurality of alarms and configured to format a respective alarm received for a respective device and to format the respective alarm of the plurality of alarms with additional customized mappings. The system further includes an alarm-to-audio cue manager configured to retrieve from the alarm-to-mapping system one or more respective audio tones corresponding to the respective alarm monitored, each of the respective audio tones having a respective plurality of audible data parameters and a sequencer configured to communicate the one or more respective audio tones having the respective plurality of audible data parameters retrieved to a sound generator for generating the respective audio tones matching the respective alarm for the respective device that is monitored, such that a client is audibly alerted of the error on the respective device via the respective alarm. In an embodiment, the monitoring system is further configured to decrypt the respective alarm received for the respective device and to define, using XML, a group in the network that the respective device is associated with and is configured to describe, using XML, the respective alarm having the respective audio tones for the respective device. In an embodiment, the alarm-to-audio cue manager is further configured to filter an alarm based on the defining of the group in the network that the device is associated with and based on the describing of the alarm for the device. In an embodiment, the alarm-to-audio cue manager is further configured to monitor each of the plurality of alarms either in real time mode or in batch mode. In an embodiment, the alarm-to-audio cue manager includes the sequencer and wherein the alarm-to-audio cue manager is further configured to transmit the respective audio tones having the respective plurality of audible data parameters retrieved from the alarm-to-mapping system to the sequencer. In an embodiment, the plurality of audible data parameters includes at least one of duration, pitch, velocity and channel and wherein the sound generator includes at least one of a directly connected sound generator and a remotely connected sound generator.

In yet another aspect of the invention, there is provided a computer program product for audio tone based monitoring of network alarms. The computer program product includes a computer readable medium, first program instructions to generate a network alarm of a plurality of network alarms for at least a monitored device on a network experiencing an error, second program instructions to decrypt the network alarm generated for the monitored device and to format the network alarm with additional information, and third program instructions to map the network alarm formatted to the monitored device and to generate one or more audio tones, each audio tone having a plurality of audible data parameters corresponding to the monitored device experiencing the error, wherein the one or more audio tones generated audibly alerts a client of the network alarm corresponding to the monitored device. In an embodiment, the first program instructions include instructions to map one or more respective audio tones having a respective plurality of audible data parameters corresponding to a respective network alarm for a respective monitored device on the network. In an embodiment, the second program instructions include instructions to define, using XML and a group in the network that the monitored device is associated with. In an embodiment, the third program instructions include instructions to query whether or not the network alarm formatted is mapped to one or more audio tones corresponding to the monitored device. In an embodiment, the third program instructions include instructions to retrieve the one or more audio tones having the plurality of audible data parameters matching the monitored device and to send the one or more audio tones having the plurality of audible data parameters to a sound generator for creating the audio tones. In an embodiment, the plurality of audible data parameters includes at least one of duration, pitch, velocity and channel and wherein the sound generator includes at least one of a directly connected sound generator and a remotely connected sound generator. Preferably, the first, second and third program instructions are recorded on the computer readable medium.

Further, in yet another aspect of the invention, there is provided a process for deploying computing infrastructure including integrating computer-readable code into a computing system, wherein the code in combination with the computing system is capable of performing a process for audio tone based monitoring of network alarms. The process includes mapping one or more respective audio tones, each of the one or more audio tones having a respective plurality of audible data parameters, for generating a respective alarm corresponding to a respective error associated with a respective monitored device on a network and generating an alarm for an error associated with a monitored device. Further, the process includes formatting, using XML, the alarm generated for the monitored device to add additional data, the additional data including at least one of severity level and group information. The process further includes retrieving one or more audio tones, each of the audio tones having a plurality of audible data parameters matching the alarm generated for the monitored device, sending to a sequencer the one or more audio tones retrieved having the plurality of audible data parameters for the error associated with the monitored device and playing the one or more audio tones having the plurality of audible data parameters corresponding to the alarm generated for the monitored device, such that the one or more audio tones generated audibly alerts a client of the error associated with the monitored device. The process further includes providing an alarm-to-audio cue manager for audibly monitoring at least one alarm generated by the respective monitored device on the respective network. In an embodiment, the formatting step further includes decrypting the alarm received and defining, using XML, a group in the network that the monitored device is associated with. In an embodiment, the retrieving step further includes querying whether the alarm generated for the monitored device is mapped to the one or more audio tones having a respective plurality of audible characteristics and if the alarm generated for the monitored device is mapped, communicating the one or more audio tones having the respective plurality of audible data parameters to a sound generator for playing the respective audio tones. In an embodiment, the plurality of audible data parameters includes at least one of duration, pitch, velocity and channel and wherein the sound generator includes at least one of a directly connected sound generator and a remotely connected sound generator.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
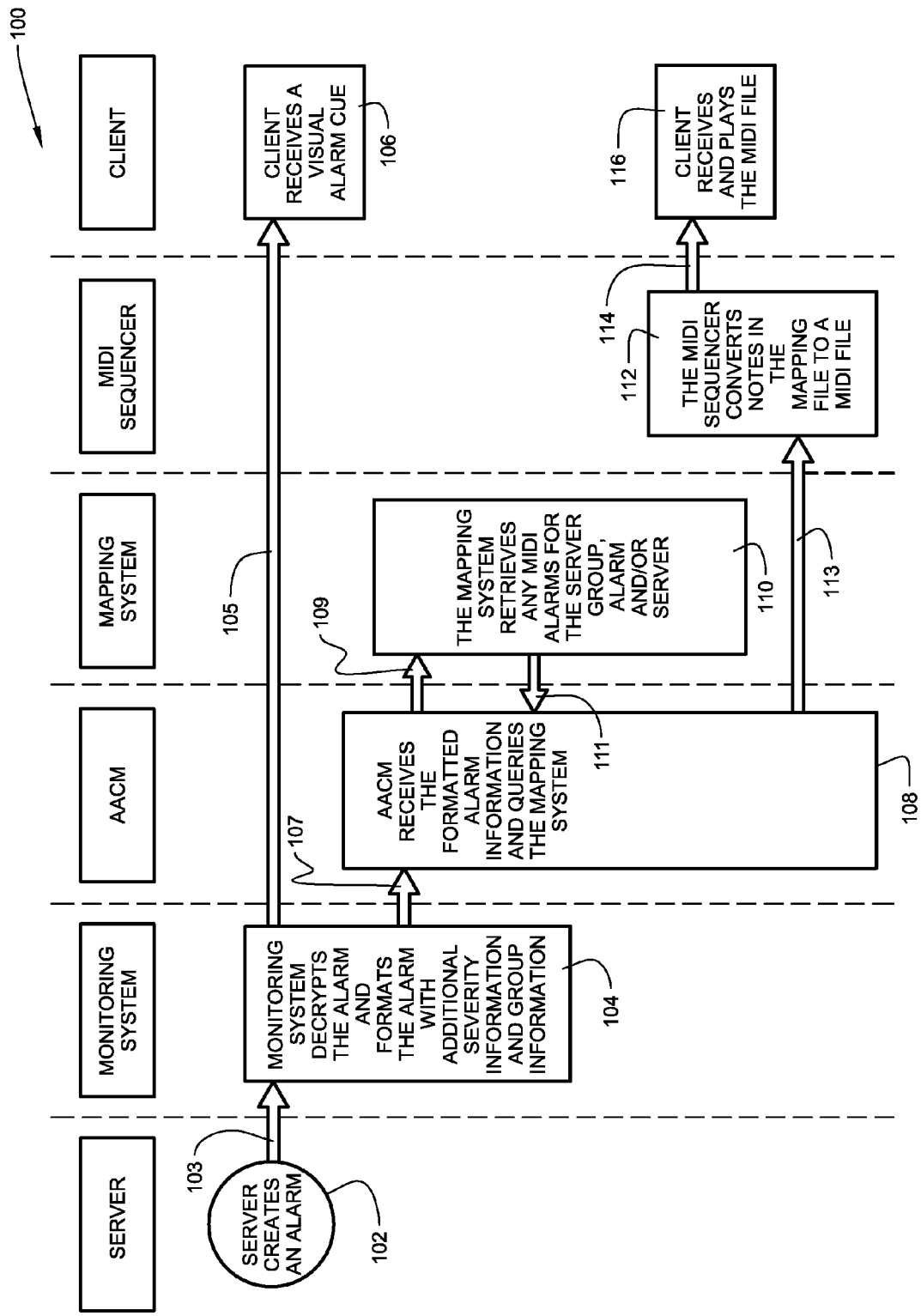
FIG. 1 depicts a flowchart which outlines the steps involved in tonal audio-based monitoring of network alarms, in accordance with an embodiment of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network.

Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, the invention provides a method for audibly monitoring an alert in a network. The method comprises mapping, using a mapping system, a severity level for a respective alert for a respective device in the network to one or more respective audio tones having a respective plurality of audible characteristics. The method comprises generating an alert for a device in a network when an error associated with the device is learned and sending to a monitoring system the alert generated for the device in the network, the alert containing data or information. The method further comprises decrypting the respective alert received and formatting the alert received to add additional information and forwarding the alert formatted to an alert-to-audio cue manager. In an embodiment, the formatting step comprises defining, using XML, a group in the network that the respective device is associated with. Further, the method comprises mapping the alert forwarded to one or more audio tones, each audio tone having a plurality of audible characteristics, and playing the audio tones, such that the audio tones played audibly alerts a client of the alert generated. In an embodiment, the mapping step comprises querying whether the respective alert received for the device having a respective severity level is mapped to one or more respective audio tones having the respective plurality of audible characteristics and if the alert received for the respective device is mapped, verifying a configuration of a sound generator to be used for producing the respective audio tones. The method further comprises filtering an alert based on the defining of the group in the network that the device is associated with and based on the formatting of the alert to add additional information. In an embodiment, the playing step further comprises communicating the respective audio tones having the respective plurality of audible data characteristics corresponding to the respective alert to the client via the sound generator. In an embodiment, the plurality of audible data characteristics comprises at least one of duration, pitch, velocity and channel and wherein the sound generator comprises at least one of a directly connected sound generator and a remotely connected sound generator.

Reference is now made to FIG. 1, which outlines the method steps involved in tonal audio-based monitoring of network alarms, in accordance with an embodiment of the invention. Turning to FIG. 1, numeral 100 depicts a flowchart that outlines the method steps for tonal audio-based monitoring of network alarms associated with errors or problems with a network device that is experiencing either a hardware related issue or a software related issue, for instance, an error or a problem with a switch on a network or an error or problem with a CPU for a particular server on a network, etc. The method begins at step 102 where an alarm or alert or trap is created by a network device, for instance, a server on a network that is experiencing an error or a problem. When an error or problem is detected on the network device, the device generates or creates in step 102 an alarm or alert or trap, which is sent (indicated by arrow 103) to the monitoring system in order to notify the monitoring system that the particular device is experiencing an error or a problem. In an embodiment, the alarm or alert or trap that is generated by the device, for instance, a server, contains encrypted data or information that indicates or identifies the device, the level of severity for the alarm or alert or trap that is detected. In an embodiment, each error on a device to be monitored has an alert or alarm or trap identification (ID), which corresponds to a description of the alert or alarm or trap that is generated. Further, each error on a device to be monitored is mapped in a mapping system to a set of audio parameters, such as, Musical Instrument Digital Interface (MIDI) parameters (for instance, duration, pitch, velocity and/or channel) for performing one or more audio tones matching the set of audio or MIDI parameters, such that, performance of the audio tone or series of audio tones notifies the user or owner of the device that the error is detected on as well as the nature of the error. Furthermore, varying levels of severity may be associated with an alarm or alert or trap. For example, an alarm or alert or trap may be mapped in a mapping system to a set of audio or MIDI parameters that indicate a warning (low-level severity) by playing one or more audio tones with a low volume. Similarly, an alarm or alert or trap may be mapped to a set of MIDI parameters that indicate an error (mid-level severity) or, further yet, an alarm or alert or trap may be mapped to a set of MIDI parameters that indicate a severe error (high-level severity). It is understood by one skilled in the art that varying degrees or levels of severity may be designated or associated with an error that occurs on a particular device and that various mapping schemes can be used to track a particular error. As such, when the monitoring system receives the alarm or alert or trap from the server, the monitoring system decrypts or deciphers in step 104 the alarm or alert or trap by comparing the alarm or alert or trap ID to the descriptive information retrieved, for instance, from a repository or a database associated with the monitoring system that stores the descriptive information. The monitoring system sends (indicated by arrow 105) a visual alarm or alert cue to a client, visually notifying the owner or user of the descriptive information corresponding to the alert or alarm or trap, which visual alarm cue is received by the client in step 106. Further, in step 104, the monitoring system formats the alert or alarm or trap received from the server to add additional data or information, such as, information identifying the server group or cluster that the server belongs to and/or additional data or information pertaining to the level of severity. In an embodiment, the monitoring system formats the alarm or alert, using XML (Extensible Markup Language) to add additional data or information, such as, the server group information, so that the monitoring system can use the additional data or information to filter an alarm or alert. After the monitoring system formats the alert or alarm or trap, the monitoring system forwards or sends (indicated by arrow 107) the formatted alert or alarm or trap to an alert-to-audio cue manager or an alarm-to-audio cue manager (AACM). The alert-to-audio cue manager (AACM) receives in step 108 the formatted alert and queries (indicated by arrow 109) a mapping system to determine whether or not there is a mapping file in a mapping database that contains a set of audible data parameters or MIDI parameters for producing one or more audio tones corresponding to the alarm or alert that is received. The mapping system in step 110 retrieves a mapping file containing any audible data parameters or MIDI parameters corresponding to the alarm and returns (indicated by arrow 111) the mapping file retrieved to the alert-to-audio cue manager (AACM). The alarm-to-audio cue manager also determines a set of audio output devices or sound generators to be used for generating the audio tone having the plurality of audible data parameters or MIDI parameters. For instance, a configuration file may be used to indicate that the MIDI data is to be sent to one or more directly connected sound generators or that a broadcast signal is to be sent to one or more remote devices, such as, remote sound generators or MIDI-enabled handheld devices, such as cell phones, or that the MIDI data is to be sent to both directly connected sound generators and to remote sound generators. The alarm-to-audio cue manager (AACM) sends (indicated by arrow 113) the audible data parameters or MIDI parameters received to a sequencer, in particular, a MIDI sequencer. Although FIG. 1 shows the MIDI sequencer being separate from the AACM, in an embodiment, the MIDI sequencer is incorporated within the AACM. If no MIDI parameters are found, the mapping system returns to the AACM a default set of MIDI parameters for producing a default tone or tones. In an embodiment, the sequencer or MIDI sequencer is configured to orchestrate the set of audio output devices set forth in the configuration file and is configured to send the audible data parameters or MIDI parameters to the audio output devices or sound generators at the proper time, so that the sound generators can generate the audio tone having the audible data parameters or MIDI parameters. The MIDI sequencer converts in step 112 the MIDI parameters in the mapping file to a MIDI file and sends (indicated by arrow 114) the MIDI file to the appropriate output device on the client. The client receives in step 116 the MIDI file and plays the MIDI file, thus, the nature of the error on a particular device is conveyed by the nature of the audio tone(s) generated and the owner or user is audibly alerted of the error on a particular device by simply listening to the audio tone(s) generated.

In another embodiment, the invention provides a system for audio tonal monitoring of network alarms. The system comprises an alarm-to-mapping system configured to map for a device in a network an alarm of a plurality of alarms, the alarm for the device corresponding to an error and being mapped to one or more audio tones, each of the one or more audio tones having a plurality of audible data parameters. The system further comprises a monitoring system configured to monitor the plurality of alarms and configured to format a respective alarm received for a respective device and to format the respective alarm of the plurality of alarms with additional customized mappings. The system further comprises an alarm-to-audio cue manager configured to retrieve from the alarm-to-mapping system one or more respective audio tones corresponding to the respective alarm monitored, each of the respective audio tones having a respective plurality of audible data parameters and a sequencer configured to communicate the one or more respective audio tones having the respective plurality of audible data parameters retrieved to a sound generator for generating the respective audio tones matching the respective alarm for the respective device that is monitored, such that a client is audibly alerted of the error on the respective device via the respective alarm. In an embodiment, the monitoring system is further configured to decrypt the respective alarm received for the respective device and to define, using XML, a group in the network that the respective device is associated with and is configured to describe, using XML, the respective alarm having the respective audio tones for the respective device. In an embodiment, the alarm-to-audio cue manager is further configured to filter an alarm based on the defining of the group in the network that the device is associated with and based on the describing of the alarm for the device. In an embodiment, the alarm-to-audio cue manager is further configured to monitor each of the plurality of alarms either in real time mode or in batch mode. In an embodiment, the alarm-to-audio cue manager comprises the sequencer and wherein the alarm-to-audio cue manager is further configured to transmit the respective audio tones having the respective plurality of audible data parameters retrieved from the alarm-to-mapping system to the sequencer. In an embodiment, the plurality of audible data parameters comprises at least one of duration, pitch, velocity and channel and wherein the sound generator comprises at least one of a directly connected sound generator and a remotely connected sound generator.

Figure 2:
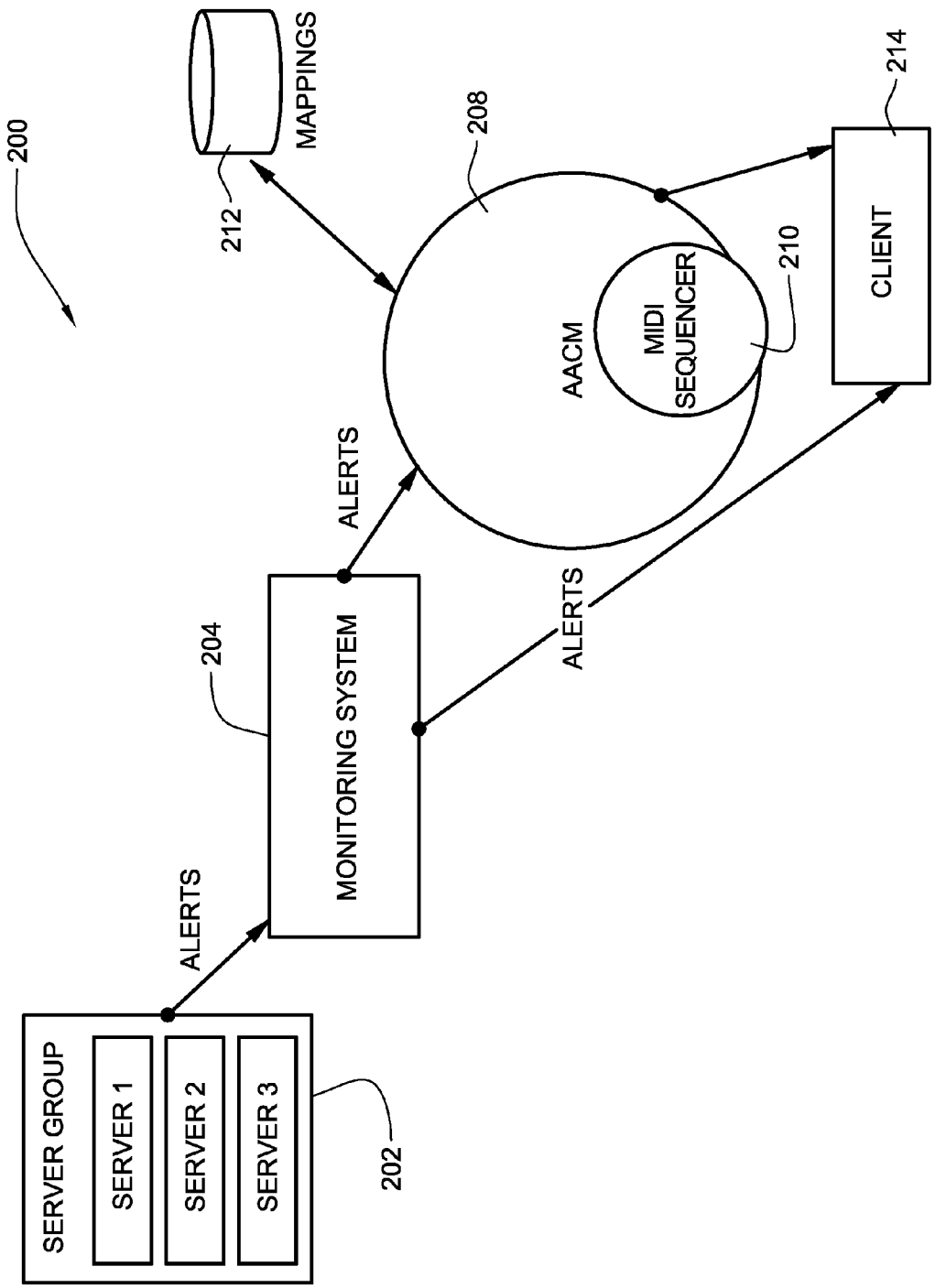
FIG. 2 is a schematic block system diagram illustrating an embodiment of a system for tonal audio-based monitoring of network alarms, in accordance with an embodiment of the present invention.
Figure 3:
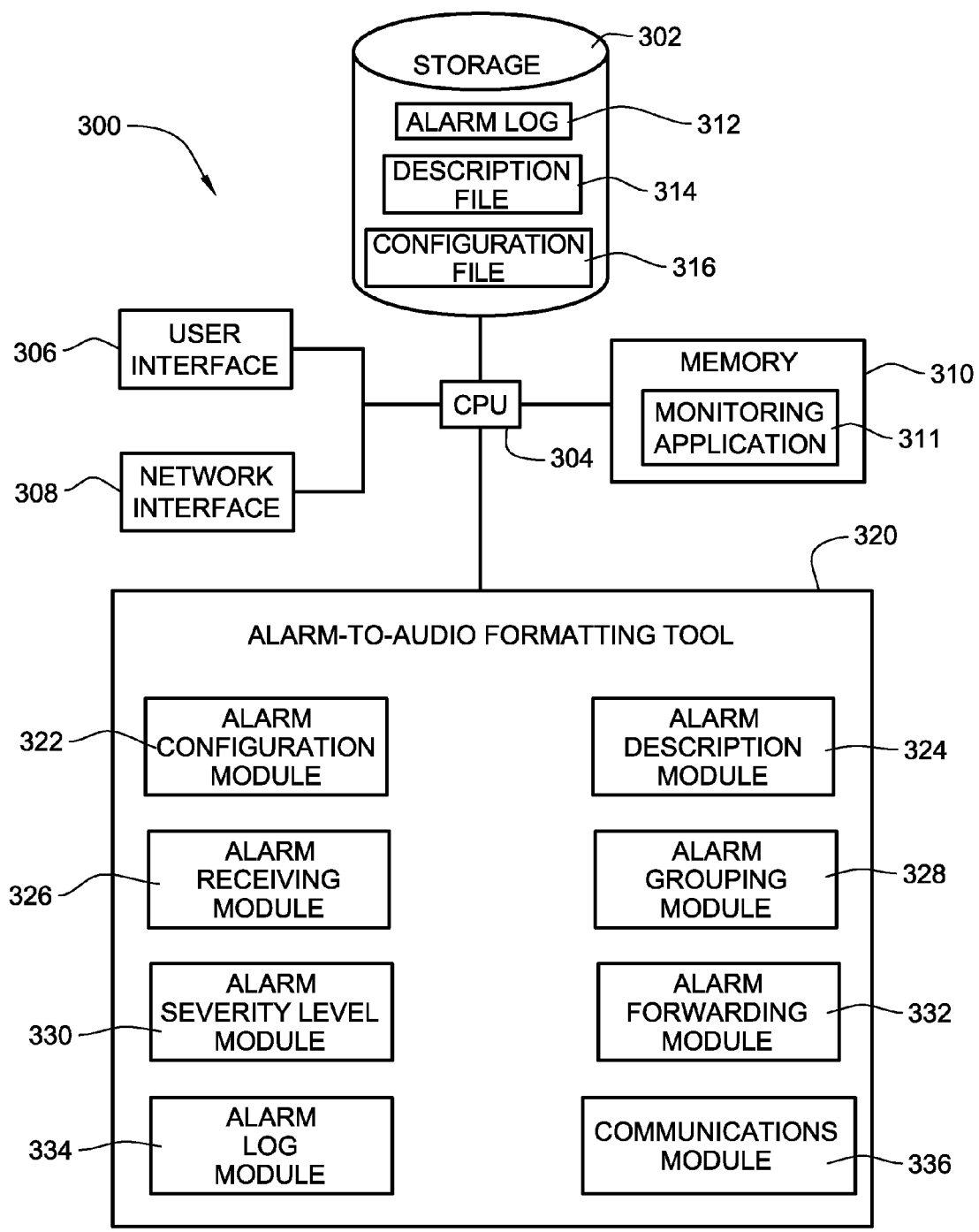
FIG. 3 is a schematic block system diagram illustrating an embodiment of a monitoring system for tonal audio-based monitoring of network alarms, in accordance with an embodiment of the invention.

Reference is now made to FIGS. 2 and 3, which illustrate various embodiments of a system for tonal audio-based monitoring of network alarms or alerts or traps. Turning to FIG. 2, reference numeral 200 provides a schematic block diagram of an embodiment of a system 200 for tonal audio-based monitoring of network alarms. The system 200 comprises one or more servers on a network, for instance, a server group or cluster 202 that includes servers 1, 2 and 3, as shown in FIG. 2. Although, FIG. 2 shows a server group 202, it is understood that the system 200 could comprise of individual servers or logical units on a server rather than a server group. Alternatively, the system 200 could comprise of a plurality of server groups instead of a single server group 202 as shown in FIG. 2. Accordingly, when there is an error or a problem with either a hardware or a alert or alarm or trap is generated or created by the device or server 1 in the server group 202 that contains an alert or alarm or trap identification (ID), which corresponds to a description of the alert or alarm or trap that is generated. In an embodiment, the alert or alarm or trap generated is encrypted and conveys data or information to the monitoring system 204, such as, the device or server that the error is detected on (namely, server 1) and/or the level of severity for the error, such as, either a warning, an error or a severe error, as discussed herein above. In an embodiment, the monitoring system 204 is configured to decrypt or decipher or translate the alarm or alert received from server 1 in the server group 202 by retrieving descriptive information corresponding to the alarm or alert or trap ID, for instance, from a repository or a database associated with the monitoring system 204. The monitoring system is configured to send a visual alarm or alert cue to a client 214, visually notifying the owner or user of the descriptive information corresponding to the alert or alarm or trap. Further, the monitoring system 204 is configured to format the alarm or alert received from server 1 to add additional data or information, such as, information that server 1 belongs to the server group 202. In an embodiment, the monitoring system 204 formats the alarm or alert, using XML (Extensible Markup Language) to add additional data or information, such as, the server group information, so that the monitoring system 204 can use the additional data or information to filter an alarm or alert. It is understood by one skilled in the art that the monitoring system 204 may format the alarm or alert or trap received to add additional information, such as, formatting a particular volume level at which the alarm or alert is played based on the level of severity of the error. Furthermore, the monitoring system 204 sends the formatted alarm or alert to an alarm-to-audio cue manager (also referred to herein as an alert-to-audio cue manager or AACM) 208 that is configured to manage alerts or alarms received from the monitoring system 204 pertaining to devices monitored on the network. The alarm-to-audio cue manager (AACM) 208 looks up or queries a mapping system 212 in order to determine whether or not the alert or alarm is mapped within the mapping system. The mapping system 212 is configured to store mappings for each alarm or alert to be monitored. In an embodiment, the mapping system 212 is configured to retrieve a mapping file that contains a set of audible data parameters or MIDI parameters for producing one or more audio tones corresponding to the alarm or alert that is generated and is configured to send the set of audible data parameters or MIDI parameters retrieved for the alarm to the alarm-to-audio cue manager (AACM) 208. Further, the alarm-to-audio cue manager is configured to determine a set of audio output devices or sound generators to be used for generating the audio tone having the plurality of audible data parameters or MIDI parameters. For instance, a configuration file may be used to indicate that the MIDI data is to be sent to one or more directly connected sound generators or that a broadcast signal is to be sent to one or more remote devices, such as, remote sound generators or MIDI-enabled handheld devices, such as cell phones, or that the MIDI data is to be sent to both directly connected sound generators and to remote sound generators. The alarm-to-audio cue manager (AACM) 208 is configured to send the audible data parameters or MIDI parameters received from the mapping system 212 to a sequencer 210, in particular, a MIDI sequencer within the AACM 208. If no MIDI parameters are found, the mapping system returns to the AACM a default set of MIDI parameters for producing a default tone or tones. In an embodiment, the sequencer or MIDI sequencer 210 is configured to orchestrate the set of audio output devices set forth in the configuration file and is configured to send the audible data parameters or MIDI parameters to the audio output devices or sound generators at the proper time, so that the sound generators can generate the audio tone or tones having the audible data parameters or MIDI parameters. In an embodiment, the MIDI sequencer 210 is configured to convert the MIDI parameters in the mapping file to a MIDI file and is further configured to send the MIDI file to the appropriate output device on the client 214. The client 214 is configured to receive the MIDI file and is configured to play the MIDI file, such that, the nature of the error on a particular device is conveyed by the nature of the audio tone(s) generated and the owner or user is audibly alerted of the error on a particular device by simply listening to the audio tone(s) generated.

Reference is now made to FIG. 3, which illustrates an embodiment of a system for audio tonal based monitoring of network alarms or alerts or traps. Turning to FIG. 3, FIG. 3 is a schematic block system diagram illustrating one embodiment of a system or server 300, such as a monitoring server that has deployed thereon an alarm-to-audio formatting tool or program or component 320 (also referred to herein as alert-to-audio formatting tool), the alarm-to-audio formatting program or component or tool 320 being configured to format an alert that is received by the monitoring system or server by adding additional information that is used by the alarm-to-audio cue manager (AACM) to manage or audibly play alarms or alerts corresponding to errors detected on a network, in accordance with an embodiment of the invention. Preferably, the system 300 is a server, for instance, a monitoring server that includes a central processing unit (CPU) 304, a local storage device 302, a user interface 306, a network interface 308, and a memory 310. The CPU 304 is configured generally to execute operations within the system/server 300. The user interface 306, in one embodiment, is configured to allow a user to interact with the monitoring system 300, including allowing input data and commands from a user and communicating output data to the user. The network interface 308 is configured, in one embodiment, to facilitate network communications of the system 300 over a communications channel of a network (not shown in any of the drawings). In an embodiment, the local memory 310 is configured to store one or more applications or programs, such as the monitoring application 311 running on the system or server 300 and being configured to monitor one or more devices on a network. Further, in an embodiment, an alarm or alert log 312, which contains a log of all the alarms or alerts received, is stored in storage system 302. Furthermore, in an embodiment, the storage 302 stores a description file 314, which contains a written description of the alarm or alert that is sent to a client, so that a user at a client is provided with a visual display or description of the nature of the alert. Additionally, the storage 302 is configured to store a configuration file 316, which contains configuration data, such as, what types of audio output devices or sound generators to communicate the MIDI parameters for producing or playing the audio tone(s). Alternatively, the log file 312, the mapping file 314 and/or the configuration file 316 may be stored in memory 310 or in a separate storage.

In one embodiment, as shown in FIG. 3, the alarm-to-audio formatting program or tool 320 which runs on the monitoring server or system 300 comprises a logic unit that contains a plurality of modules configured to functionally execute the necessary steps of performing audio tonal monitoring of alerts generated by one or more devices in a network. In particular, the alarm-to-audio cue formatting component or tool 320 includes an alarm configuration module 322, an alarm description module 324, an alarm receiving module 326, an alarm grouping module 328, an alarm severity level module 330, an alarm forwarding module 332, an alarm log module 334, and a communications module 336. The alarm configuration module 322 is configured to store in a configuration file 316 in local storage 302, configuration data, such as, whether the alert is to be monitored in real time mode or in batch mode, time intervals for batch mode processing, etc. The alarm description module 324 is configured to store in the description file 314 in local storage 302 a written description corresponding to the alert or alarm generated by a device. The alarm receiving module 326 is configured to receive one or more alarms generated by devices on a network that are being monitored by the monitoring system 300. Further, the alarm receiving module 326 is configured to decipher or translate the alarm received using the description provided in the description file 314. The alarm grouping module 328 is configured to add grouping information or data for the one or more alarms received by the monitoring system, for instance, to add information as to which server group or cluster that a device that generated the alarm belongs to or to add information as to the logical unit that the device belongs to, preferably, using XML (Extensible Markup Language). The alarm severity level module 330 is configured to add additional severity level information, preferably, using XML (Extensible Markup Language) to provide additional severity level information to the alarm-to-audio cue manager (AACM). The alarm forwarding module 332 is configured to forward an alarm that has been additionally formatted to the alarm-to-audio cue manager (AACM), such that, the alarm-to-audio cue manager (AACM) can manage the alerts received from the monitoring application 311 based on the additional information or data provided in the formatted alerts. The alarm log module 334 is configured to write to or store in an alert or alarm log 312 all the alerts received from devices being monitored by the monitoring system 300. Further, the communications module 336 is configured to permit communication between the various modules of the alarm-to-audio formatting tool 320 and other components, such as, the storage 302, which contains the alarm log file 312, the description file 314, and the configuration file 316 and/or programs running in memory 310. As mentioned herein above, the formatting of the alarm generated by a device and processed by the alarm-to-audio cue manager (AACM), provides audible alerts to a user at a client, such that the nature of the error and the device experiencing the error is conveyed by the nature of the audio tones generated and the owner is audibly alerted of the error on the device by simply listening to the audio tone(s) generated on the connected or remote device(s).

For example, an alert or alarm that may be monitored and communicated audibly is a particular error, such as, a critical server running out of storage space on a network. In order to monitor any alerts generated by the server, the server is mapped by a mapping system in an alert-to-mapping file or mapping file. In particular, the mapping system maps the alert to a plurality of audible or audio tones that have certain audible characteristics, such as, duration, pitch, velocity and channel. Accordingly, a monitoring system is used to track or monitor the server and if an alert or alarm is generated by the server, the monitoring system detects the alarm or alert and the monitoring system decrypts the alarm and formats the alarm to add additional data or information, such as, the group of servers or server cluster that the server belongs to. Further, the monitoring system notifies an AACM (alert-to-audio manager or alarm-to-audio manager) of the alert or alarm generated by the server. Furthermore, the monitoring system sends a visual alarm or alert cue to a client, such that, the client is visually notified of the alert. The AACM (alert-to-audio manager) queries the mapping system to look up in its alert-to-mapping file or mapping file the appropriate file containing audible tones corresponding to the alarm or alert that is detected by the monitoring system. The mapping system sends the mapping file containing the audible tones to the AACM. The AACM sends the mapping file to a sequencer, namely, a MIDI sequencer, which converts the notes or audible tones contained in the mapping file to a MIDI file. For instance, if the server generates an alert when the server is experiencing a storage issue, the alert or alarm to be generated may have the following audible characteristics or MIDI parameters: duration: 5; pitch: 40; velocity: 60 (this is typically translated to loudness) and channel: 1 (this is typically translated to timbre). The AACM (alert-to-audio manager) checks the configuration file to determine whether to send a MIDI (Musical Instrument Digital Interface) signal to a directly-connected sound generator, or to send a broadcast signal to a remote device, such as, a remote sound generator, or a MIDI-enabled handheld, etc., or to both types of sound generators. For example, if the sound generator is a cell phone, then the MIDI broadcast signal or message will go to the cell phone. The alert-to-audio manager sends the MIDI parameters (that is, duration, pitch, velocity, and channel) to an internal MIDI sequencer, which in turn sends the MIDI parameters or data to that cell phone (via a broadcast signal) to generate one or more sounds or audio tones, each sound or audio tone having certain audible characteristics, for instance, a duration of 5, a pitch of 40, a velocity of 60 and a channel of 1. As a result, the cell phone plays one or more audio tones having the audible characteristics mentioned herein above, such that, the nature of the alert or alarm generated by the server, in this example, an audio tone or tones having a duration of 5, pitch 40, velocity 60 and channel 1 is conveyed to the listener of the cell phone by the characteristics of the audio tones generated and, accordingly, the administrator or owner is audibly alerted of the error experienced by the server by simply listening to the audio tones generated on the cell phone.

In yet another embodiment, the invention provides a computer program product for audibly monitoring an alert or alarm generated by a device in a network. The computer program product comprises a computer readable or computer-usable medium, which provides program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. Preferably, the computer storage medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Further, preferably, network medium can comprise of transmission devices on a network, such as, cables, routers, switches and/or network adapter cards.

The computer program product further comprises first program instructions to generate a network alarm of a plurality of network alarms for at least a monitored device on a network experiencing an error, second program instructions to decrypt the network alarm generated for the monitored device and to format the network alarm with additional information, and third program instructions to map the network alarm formatted to the monitored device and to generate one or more audio tones, each audio tone having a plurality of audible data parameters corresponding to the monitored device experiencing the error, wherein the one or more audio tones generated audibly alerts a client of the network alarm corresponding to the monitored device. In an embodiment, the first program instructions comprise instructions to map one or more respective audio tones having a respective plurality of audible data parameters corresponding to a respective network alarm for a respective monitored device on the network. In an embodiment, the second program instructions comprise instructions to define, using XML and a group in the network that the monitored device is associated with. In an embodiment, the third program instructions comprise instructions to query whether or not the network alarm formatted is mapped to one or more audio tones corresponding to the monitored device. In an embodiment, the third program instructions comprise instructions to retrieve the one or more audio tones having the plurality of audible data parameters matching the monitored device and to send the one or more audio tones having the plurality of audible data parameters to a sound generator for creating the audio tones. In an embodiment, the plurality of audible data parameters comprises at least one of duration, pitch, velocity and channel and wherein the sound generator comprises at least one of a directly connected sound generator and a remotely connected sound generator. Preferably, the first, second and third program instructions are recorded on the computer readable medium.

Figure 4:
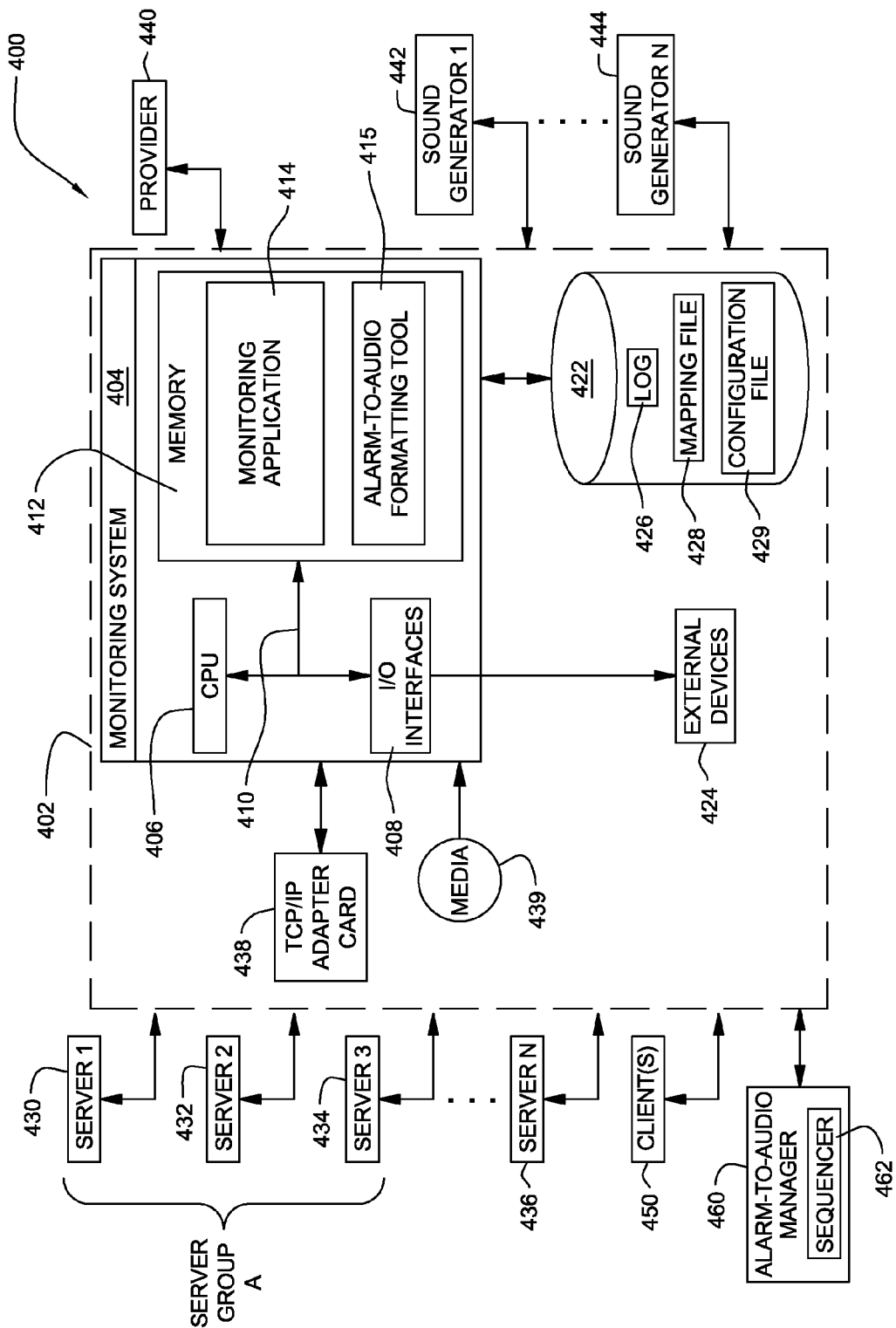
FIG. 4 is a schematic block system diagram illustrating an embodiment of a computer infrastructure for tonal audio-based monitoring of network alarms, in accordance with an embodiment of the invention.

Referring now to FIG. 4, there is illustrated a system 400 that provides a computer program product for tonal audio-based monitoring of an alert generated by a device in a network, in accordance with an embodiment of the present invention. The computer program product comprises a computer readable or computer-usable medium, which provides program code namely, the alarm-to-audio formatting code or tool 415, for use by or in connection with a monitoring computer or system or any instruction execution system. The alarm-to-audio formatting tool or program 415 can be loaded into monitoring system 404 from a computer readable media 439, such as, a magnetic tape or disk, optical media, DVD, memory stick, semiconductor memory, etc. or downloaded from the Internet via a TCP/IP adapter card 438. As depicted, system 400 includes a computer infrastructure 402, which is intended to represent any type of computer architecture that is maintained in a secure environment (i.e., for which access control is enforced). As shown, infrastructure 402 includes a computer system 404 that typically represents a server 404, for instance, a monitoring server or the like configured to audibly monitor an alert generated by a device in a network 404 that is accessed by a client (e.g., a personal computer, a laptop, a handheld device, etc), for instance, a user at a client 450. It should be understood, however, that although not shown, other hardware and software components (e.g., additional computer systems, routers, firewalls, etc.) could be included in infrastructure 402.

In general, one or more devices, for instance, one or more servers (for instance, server 1, reference numeral 430, server 2, reference numeral 432, server 3, reference numeral 434 through server N, reference numeral 436) are connected via a network to infrastructure 402, which includes an alarm-to-audio cue manager tool 415 configured to manage alarms and alerts received from the one or more servers 1 through N (reference numeral 430 through 436). As shown in FIG. 4, the servers 1, 2 and 3 (respective reference numerals 430, 432 and 434) belong to server group A and, as such, an alert or alarm generated by a server in server group A, for instance, server 1 (reference numeral 430) is received by the monitoring system 404, which formats the alarm received from server 1 to add additional data, such as, that server 1 is part of server group A. Further, as shown in FIG. 4, one or more users at client(s) 450 can interface with infrastructure 402 in order to be alerted of alarms generated by devices on the network experiencing an error. To this extent, infrastructure 402 provides a secure environment. In particular, a user at a client 450 accesses the server or system 404 over a network via interfaces (e.g., web browsers) loaded on the client, for example, a personal computer, a laptop, a handheld device, etc. In the case of the latter, the network can be any type of network such as the Internet, a local area network (LAN), a wide area network (WAN), a virtual private network (VPN), etc. In any event, communication with infrastructure 402 could occur via a direct hard-wired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, the parties could utilize an Internet service provider to establish connectivity to infrastructure 402. It should be understood that under the present invention, infrastructure 402 could be owned and/or operated by a party such as provider 440, or by an independent entity. Regardless, use of infrastructure 402 and the teachings described herein could be offered to the parties on a subscription or fee-basis. In either scenario, an administrator (not shown in FIG. 4) could support and configure infrastructure 402.

The monitoring server 404 is shown to include a CPU (hereinafter "processing unit 406"), a memory 412, a bus 410, and input/output (I/O) interfaces 408. Further, the server 404 is shown in communication with external I/O devices/resources 424 and storage system 422. In general, processing unit 406 executes computer program code stored in memory 412, such as the monitoring application 414 and the alarm-to-audio formatting tool or code 415. While executing the monitoring application 414 and/or the alarm-to-audio formatting program or code 415, the processing unit 406 can read and/or write data, to/from memory 412, storage system 422, and/or I/O interfaces 408 and can produce audio tones based on the MIDI parameters stored in the mapping file 428 on a sound generator, for instance, any appropriate sound generator 1, reference numeral 442 through sound generator N, reference numeral 444, such that the audio tones convey the nature of the device and the error to a listener. For instance, in one embodiment, the alert log file 426 that the monitoring server 404 writes to is stored in storage 422 and can be accessed by the monitoring server 404 and/or the alarm-to-audio cue manager 460. Further, the mapping or alarm-to-mapping file 428, which maps alerts to audible data characteristics or parameters, is stored in storage 422, and can be accessed by the alarm-to-audio cue manager 460. Similarly, in an embodiment, the configuration file 429, which contains configuration data as to what types of audio output devices or sound generators to communicate the MIDI parameters to, is stored in storage 422 and may be accessed by the sequencer 462 deployed on the alarm-to-audio manager 460. Alternatively, the alert or alarm log file 426, the mapping file 428 and/or the configuration file 429 could be stored in a separate storage external to infrastructure 402. Bus 410 provides a communication link between each of the components in computer system 400, such that information can be communicated within the infrastructure 402. External devices 424 can comprise any devices (e.g., keyboard, pointing device, display, etc.) that enable a user to interact with computer system 400 and/or any devices (e.g., network card, modem, etc.) that enable server 404 to communicate with one or more other computing devices.

Computer infrastructure 402 is only illustrative of various types of computer infrastructures for implementing the invention. For example, in one embodiment, computer infrastructure 402 may comprise two or more server groups or clusters (similar to server group A) that communicate over a network to perform the various process steps of the invention. Moreover, computer system 400 is only representative of various possible computer systems that can include numerous combinations of hardware. To this extent, in other embodiments, computer system 400 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 406 may comprise a single processing unit, or be distributed across one or more processing units in one or more locations, e.g., on a client and server. Similarly, memory 412 and/or storage system 422 can comprise any combination of various types of data storage and/or transmission media that reside at one or more physical locations. Further, I/O interfaces 408 can comprise any system for exchanging information with one or more external devices 424. Still further, it is understood that one or more additional components (e.g., system software, math co-processing unit, etc.) not shown in FIG. 4 can be included in computer system 400. However, if computer system 400 comprises a handheld device or the like, it is understood that one or more external devices 424 (e.g., a display) and/or storage system(s) 422 could be contained within computer system 400, not externally as shown.

Storage system 422 can be any type of system (e.g., a database) capable of providing storage for information under the present invention. To this extent, storage system 422 could include one or more storage devices, such as a magnetic disk drive or an optical disk drive. In another embodiment, storage system 422 includes data distributed across, for example, a local area network (LAN), wide area network (WAN) or a storage area network (SAN) (not shown). Although not shown, additional components, such as cache memory, communication systems, system software, etc., may be incorporated into computer system 400.

Further, in yet another embodiment, the invention provides a process for deploying computing infrastructure comprising integrating computer-readable code into a computing system, wherein the code in combination with the computing system is capable of performing a process for audio tone based monitoring of network alarms. The process comprises mapping one or more respective audio tones, each of the one or more audio tones having a respective plurality of audible data parameters, for generating a respective alarm corresponding to a respective error associated with a respective monitored device on a network and generating an alarm for an error associated with a monitored device. Further, the process comprises formatting, using XML, the alarm generated for the monitored device to add additional data, the additional data comprising at least one of severity level and group information. The process further comprises retrieving one or more audio tones, each of the audio tones having a plurality of audible data parameters matching the alarm generated for the monitored device, sending to a sequencer the one or more audio tones retrieved having the plurality of audible data parameters for the error associated with the monitored device and playing the one or more audio tones having the plurality of audible data parameters corresponding to the alarm generated for the monitored device, such that the one or more audio tones generated audibly alerts a client of the error associated with the monitored device. The process further comprises providing an alarm-to-audio cue manager for audibly monitoring at least one alarm generated by the respective monitored device on the respective network. In an embodiment, the formatting step further comprises decrypting the alarm received and defining, using XML, a group in the network that the monitored device is associated with. In an embodiment, the retrieving step further comprises querying whether the alarm generated for the monitored device is mapped to the one or more audio tones having a respective plurality of audible characteristics and if the alarm generated for the monitored device is mapped, communicating the one or more audio tones having the respective plurality of audible data parameters to a sound generator for playing the respective audio tones. In an embodiment, the plurality of audible data parameters comprises at least one of duration, pitch, velocity and channel and wherein the sound generator comprises at least one of a directly connected sound generator and a remotely connected sound generator.

Accordingly, any of the components of the present invention as shown in FIG. 4 can be deployed, managed, serviced by a service provider 440 who offers to audibly monitor network alarms generated by device(s) or server(s) within infrastructure 402 that are experiencing a problem or an error. Preferably, the invention provides a business method that performs the process steps of the invention on a subscription, advertising and/or fee basis. In particular, a service provider, such as a solution integrator could offer to audibly monitor network devices on one or more networks. In this case, the service provider can, for instance, create, maintain, and support a computer infrastructure that performs the process steps of the invention for one or more customers. In return, the service provider can receive payment from the customer or customers under a subscription and/or fee agreement and/or the service provider can receive payment from the sale or advertising of content to one or more third parties.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for audibly monitoring an alert in a network, said method comprising the steps of:
   sending to a monitoring system an alert generated for a device in a network, said alert containing data;
   formatting said alert received to add additional information;
   forwarding said alert formatted to an alert-to-audio cue manager, wherein said alert-to-audio cue manager filters said alarm based on a group in said network with which said device is associated;
   mapping said alert forwarded to one or more audio tones, each of said one or more audio tones having a plurality of audible characteristics; and
   playing said one or more audio tones, such that said one or more audio tones played audibly alerts a client of said alert generated.

2. The method according to claim 1, further comprising the step of:
   mapping, using a mapping system, a severity level for a respective alert for a respective device in said network to one or more respective audio tones having a respective plurality of audible characteristics.

3. The method according to claim 2, wherein said sending step further comprises the step of:
   generating said alert for said device in said network when an error associated with said device is learned.

4. The method according to claim 3, wherein said formatting step further comprises the steps of:
   decrypting said respective alert received; and
   defining, using XML, said group in said network that said respective device is associated with.

5. The method according to claim 4, wherein said mapping step further comprises the steps of:
   querying whether said respective alert received for said device having a respective severity level is mapped to said one or more respective audio tones having said respective plurality of audible characteristics; and
   if said alert received for said respective device is mapped, verifying a configuration of a sound generator to be used for producing said one or more respective audio tones.

6. The method according to claim 5, wherein said mapping step further comprises the step of:
   filtering an alert based on said defining of said group in said network that said device is associated with and based on said formatting of said alert to add said additional information.

7. The method according to claim 6, wherein said playing step further comprises the step of:
   communicating said one or more respective audio tones corresponding to said respective plurality of audible data characteristics retrieved for said respective alert to said client via said sound generator.

8. The method according to claim 7, wherein said plurality of audible data characteristics comprises at least one of: duration, pitch, velocity and channel; and wherein said sound generator comprises at least one of: a directly connected sound generator and a remotely connected sound generator.

9. A system for audio tonal monitoring of network alarms, comprising:
an alarm-to-mapping system configured to map for a device in a network an alarm of a plurality of alarms, said alarm for said device corresponding to an error and being mapped to one or more audio tones, each of said one or more audio tones having a plurality of audible data parameters;
a monitoring system configured to monitor said plurality of alarms and configured to format a respective alarm received for a respective device and to format said respective alarm of said plurality of alarms with additional customized mappings;
an alarm-to-audio cue manager configured to retrieve from said alarm-to-mapping system one or more respective audio tones corresponding to said respective alarm monitored, each of said one or more respective audio tones having a respective plurality of audible data parameters; and
a sequencer configured to communicate said one or more respective audio tones having said respective plurality of audible data parameters retrieved to a sound generator on a cellphone for generating said one or more respective audio tones matching said respective alarm for said respective device that is monitored, such that a client is audibly alerted of said error on said respective device via said respective alarm.

10. The system according to claim 9, wherein said monitoring system is further configured to decrypt said respective alarm received for said respective device and to define, using XML, a group in said network that said respective device is associated with.

11. The system according to claim 10, wherein said alarm-to-audio cue manager is further configured to filter an alarm based on said defining of said group in said network that said device is associated with.

12. The system according to claim 11, wherein said alarm-to-audio cue manager is further configured to monitor each of said plurality of alarms either in real time mode or in batch mode.

13. The system according to claim 12, wherein said alarm-to-audio cue manager includes said sequencer; and wherein said alarm-to-audio cue manager is further configured to transmit said one or more respective audio tones having said respective plurality of audible data parameters retrieved from said alarm-to-mapping system to said sequencer.

14. The system according to claim 13, wherein said plurality of audible data parameters comprises at least one of: duration, pitch, velocity and channel; and wherein said sound generator comprises at least one of: a directly connected sound generator and a remotely connected sound generator.

15. A computer storage medium for audio tone based monitoring of network alarms, said computer program product comprising:
first program instructions to generate a network alarm of a plurality of network alarms for at least a monitored device on a network experiencing an error, wherein said first program instructions include instructions to map one or more respective audio tones having a respective plurality of audible data parameters corresponding to a respective network alarm for a respective monitored device on said network;
second program instructions to decrypt said network alarm generated for said monitored device and to format said network alarm with additional information, wherein said second program instructions include instructions to define, using XML, a group in said network that said monitored device is associated with;
third program instructions to map said network alarm formatted to said monitored device and to generate one or more audio tones, each of said one or more audio tones having a plurality of audible data parameters corresponding to said monitored device experiencing said error, wherein said one or more audio tones generated audibly alerts a client of said network alarm corresponding to said monitored device; and wherein said first, second and third program instructions are recorded on said computer storage medium.

16. The computer storage medium according to claim 15, wherein said third program instructions include instructions to query whether or not said network alarm formatted is mapped to said one or more audio tones corresponding to said monitored device.

17. The computer storage medium according to claim 16, wherein said third program instructions include instructions to retrieve said one or more audio tones having said plurality of audible data parameters matching said monitored device and to send said one or more audio tones having said plurality of audible data parameters to a sound generator for creating said one or more audio tones.

18. The computer storage medium according to claim 17, wherein said plurality of audible data parameters comprises at least one of: duration, pitch, velocity and channel; and wherein said sound generator comprises at least one of: a directly connected sound generator and a remotely connected sound generator.

19. A process for deploying computing infrastructure comprising integrating computer-readable code into a computing system, wherein said code in combination with said computing system is capable of performing a process for audio tone based monitoring of network alarms, said process comprising:
mapping one or more respective audio tones, each of said one or more respective audio tones having a respective plurality of audible data parameters, for generating a respective alarm corresponding to a respective error associated with a respective monitored device on a network;
generating an alarm for an error associated with a monitored device;
formatting, using XML, said alarm generated for said monitored device to add additional data, said additional data including at least one of: severity level and group information;
retrieving one or more audio tones matching said alarm generated for said monitored device, each of said one or more audio tones having a plurality of audible data parameters;
sending to a sequencer said one or more audio tones retrieved having said plurality of audible data parameters for said error associated with said monitored device; and
playing said one or more audio tones having said plurality of audible data parameters corresponding to said alarm generated for said monitored device, such that said one or more audio tones generated audibly alerts a client of said error associated with said monitored device.

20. The process according to claim 19, further comprising the step of:
providing an alarm-to-audio cue manager for audibly monitoring at least one alarm generated by said respective monitored device on said respective network.

21. The process according to claim 20, wherein said formatting step further comprises the steps of:

decrypting said alarm received; and defining, using XML, a group in said network that said monitored device is associated with.

22. The process according to claim 21, wherein said retrieving step further comprises the steps of:

querying whether said alarm generated for said monitored device is mapped to said one or more audio tones having a respective plurality of audible data parameters; and if said alarm generated for said monitored device is mapped, communicating said one or more audio tones having said respective plurality of audible data parameters to a sound generator for playing said one or more audio tones.

23. The process according to claim 22, wherein said plurality of audible data parameters comprises at least one of: duration, pitch, velocity and channel; and wherein said sound generator comprises at least one of: a directly connected sound generator and a remotely connected sound generator.

* * * * *